(12) United States Patent
Raes et al.

(10) Patent No.: US 7,976,279 B2
(45) Date of Patent: Jul. 12, 2011

(54) BLADE PITCH ACTUATION MECHANISM

(75) Inventors: Mark Raes, Andover, CT (US); Paul A. Carvalho, Westfield, MA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 1065 days.

(21) Appl. No.: 11/811,491

(22) Filed: Jun. 11, 2007

(65) Prior Publication Data
US 2010/0021304 A1    Jan. 28, 2010

(51) Int. Cl.
*B64C 11/38* (2006.01)
(52) U.S. Cl. ............ 416/157 B; 416/155; 416/164
(58) Field of Classification Search ............ 416/155, 416/157 B, 153, 154, 164
See application file for complete search history.

(56) References Cited

U.S. PATENT DOCUMENTS

| | | | |
|---|---|---|---|
| 4,738,591 | A | 4/1988 | Butler |
| 4,817,382 | A | 4/1989 | Rudolph et al. |
| 4,884,948 | A | 12/1989 | Sikorski |
| 5,364,231 | A | 11/1994 | Eick et al. |
| 5,836,743 | A | 11/1998 | Carvalho et al. |
| 5,961,067 | A | 10/1999 | Hall et al. |
| 6,015,264 | A | 1/2000 | Violette et al. |
| 6,077,040 | A | 6/2000 | Pruden et al. |
| 6,280,142 | B1 | 8/2001 | Pruden et al. |
| 6,514,044 | B2 | 2/2003 | Talasco et al. |
| 7,296,969 | B2 * | 11/2007 | Raes et al. ............ 416/36 |

* cited by examiner

*Primary Examiner* — Edward Look
*Assistant Examiner* — Dwayne J White
(74) *Attorney, Agent, or Firm* — Kinney & Lange, P.A.

(57) ABSTRACT

A blade pitch actuation mechanism for a plurality of propeller blades supported in a blade hub comprises a plurality of bearing assemblies, a bearing support plate and a yoke. The plurality of bearing assemblies receives a plurality of actuation trunnion pins from the plurality of propeller blades. The bearing support plate is connected to the plurality of bearing assemblies and unifies the plurality of bearing assemblies in a ring-like configuration. The yoke is connected to the bearing support plate and translates within the hub to adjust the pitch of the plurality of propeller blades.

33 Claims, 8 Drawing Sheets

BLADE PITCH ACTUATION MECHANISM

BACKGROUND

The present invention relates to blade pitch actuation mechanisms and in particular to actuator supported bearing assemblies for use in propeller blade pitch actuation mechanisms for turboprop engines.

Turboprop engines are well suited to large payload capacity cargo planes due their high propulsive efficiency, i.e. their ability to turn power into usable thrust, which results in high fuel efficiency. Cargo planes typically require multiple engines to produce the power necessary to propel such large, heavily loaded aircraft. Many such multi-engine aircraft utilize opposite rotation turboprop engines, a right-hand (clockwise) rotating engine and a left-hand (counterclockwise) rotating engine on each wing, to reduce the turbulence effect of exit swirl and to reduce torque loads on wing structures.

In a turboprop engine, a turbine is used to drive propeller blades for producing thrust. In a typical configuration, a spool comprising a compressor and a turbine is used to sustain a combustion process and produce hot gas for driving a free turbine. The free turbine, in turn, is used to drive a gearbox that rotates the propeller blades. In order to maintain engine efficiency during flight, turboprop engines are operated at a constant, peak-efficiency speed. Changes in engine power output are controlled by fuel flow and propeller blade pitch, which is controlled by a blade pitch actuation mechanism. Each propeller blade is typically connected to the blade pitch actuation mechanism through a trunnion pin and bearing assembly interface, which provides the force necessary to counter the rotational torque imparted to the propeller blade by the air stream and rotating forces generated by the mass distribution of the blade. The pitch of a propeller blade mounted on a right-hand engine is adjusted in the opposite direction as a blade mounted on a left-hand engine, thus necessitating differences in blade pitch actuation mechanism for left-hand and right-hand engines. It is, nonetheless, desirable to maintain interchangeability of parts for both right-hand and left-hand rotating engines to reduce time and expense in both production and maintenance of the engines. Additionally, the increased twisting moment about the pitch change axis of large propeller blades is translated to the blade pitch actuation mechanism. Thus, the bearing assembly surrounding the trunnion pin, which bears the reactive forces, is typically a high-wear component, especially as the size and thrust output of turboprop engines increase.

There is, therefore, a need to increase the interchangeability of blade pitch actuation mechanisms for left-hand and right-hand configured engines. Additionally, there is a need for a wear-resistant and heavy-duty bearing assembly, as well as for a blade pitch actuation mechanism that permits easy maintenance and assembly.

SUMMARY

The present invention is directed toward a blade pitch actuation mechanism for a plurality of propeller blades supported in a blade hub. The blade pitch actuation mechanism comprises a plurality of bearing assemblies, a bearing support plate and a yoke. The bearing assemblies receive actuation trunnion pins from the plurality of propeller blades. The bearing support plate is connected to and unifies the plurality of bearing assemblies in a ring-like configuration. The yoke is connected to the bearing support plate and translates within the hub to adjust the pitch of the plurality of propeller blades.

DETAILED DESCRIPTION

Figure 1:
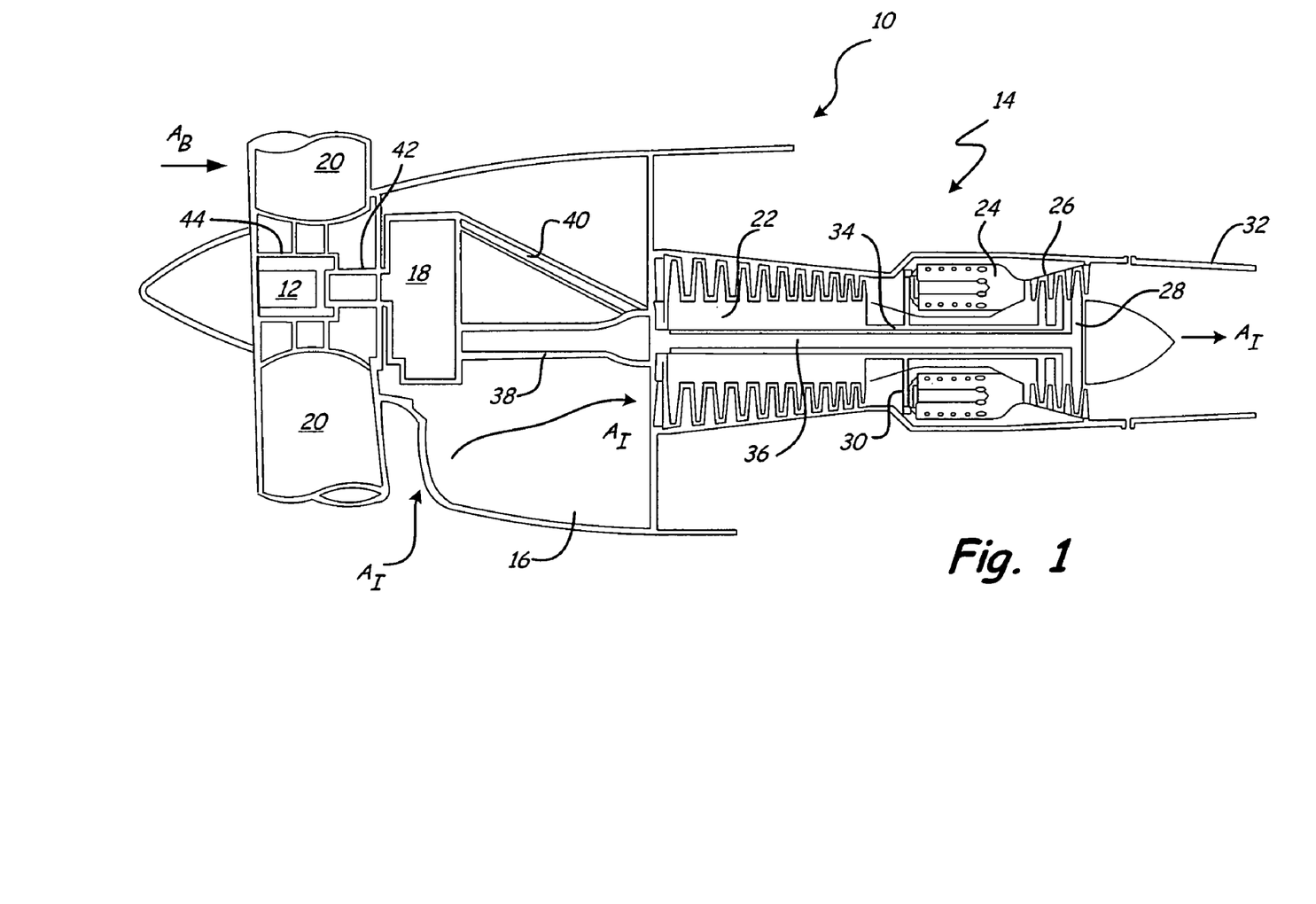
FIG. 1 shows a schematic view of a turboprop engine in which the blade pitch actuation mechanism of the present invention is used.

FIG. 1 shows a schematic side view of turboprop engine 10 in which blade pitch actuation mechanism 12 of the present invention is used. Although the invention is hereinafter described with respect to a turboprop propeller system, the invention is also applicable to other systems such as tilt rotor and tilt wing systems. Turboprop engine 10 also includes core engine 14, inlet cowl 16, gearbox 18 and propeller blades 20. Inlet air $A_I$ enters turboprop engine 10 through inlet cowl 16 so that it can be used to sustain a combustion process within core engine 14. Core engine 14 includes compressor 22, combustor section 24, core turbine 26 and free turbine 28. Inlet air $A_I$ is compressed by compressor 22 to supply a high-density mass of air to combustor section 24. The mass of air is mixed with a fuel from injectors 30, whereby a combustion process is carried out to supply high-energy gas for turning core turbine 26 and free turbine 28. Inlet air $A_I$, in the form of the high-energy gas, is thereafter routed out of core engine 14 and turboprop engine 10 at exit duct 32. Core turbine 26 turns compressor 22 through shaft 34 to sustain the supply of pressurized air to combustor section 24. Free turbine 28 is not, however, connected with compressor 22 and is therefore free to rotate at speeds dictated by the propellers. Through shaft 36, free turbine 28 rotates propeller blades 20 to react with bypass air $A_B$ to produce thrust. Thus, together with blade pitch actuation mechanism 12, the speed and pitch of propeller blades 20 can be adjusted to control the propulsive power generated by turboprop engine 10.

Shaft 36 extends from free turbine 28, through core engine 14 and inlet cowl 16 to gearbox 18. Gearbox 18 is supported within inlet cowl 16 by shaft sleeve 38 and support strut 40. Gearbox 18 reduces the rotational speed of shaft 36 from the high speeds imparted by free turbine 28 to the lower speeds necessary for rotating large-sized propeller blades 20. Gearbox 18 is also configured to produce either left-hand or right-hand rotation of propeller blades 20. Output shaft 42 of gearbox 18 is connected to propeller hub 44, which drives propeller blades 20. Blade pitch actuation mechanism 12 is situated within hub 44 and is connected to inner diameter pitch actuation trunnion pins of propeller blades 20. Thus, in conjunction with a hydraulic actuator, the pitch of propeller blades 20 is adjusted to obtain the desired thrust output of turboprop engine 10. Blade pitch actuation mechanism 12 provides interchangeable parts configurable for actuating both left-hand and right-hand configured propellers. Actuation mechanism 12 also provides wear resistant bearing assemblies for supporting large propeller blades. Furthermore, actuation mechanism 12 provides a simpler and more easily assembled and repairable actuation system.

Figure 2:
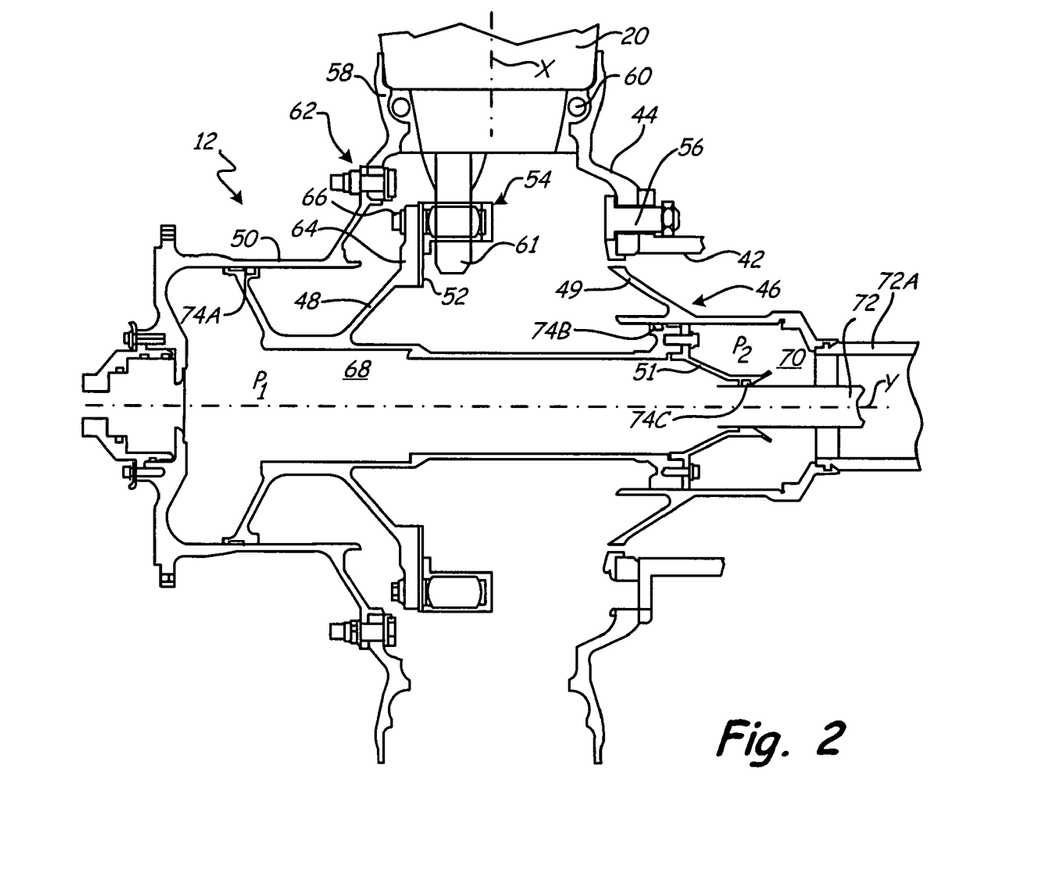
FIG. 2 shows a cross-sectional view of a hydraulic actuation mechanism having the blade pitch actuation mechanism of FIG. 1.

FIG. 2 shows a cross-sectional view of blade pitch actuation mechanism 12 of FIG. 1 assembled with output shaft 42 and propeller hub 44. Blade pitch actuation mechanism 12 includes hydraulic actuator 46 (which comprises yoke 48, aft dome 49, forward dome 50 and hydraulic coupling 51), bearing support plate 52 and bearing assembly 54. Output shaft 42, which extends from gearbox 18 (FIG. 1), is connected to propeller hub 44 and aft dome 49 at threaded fasteners 56, which typically comprises a bolt and nut. Propeller blade 20 is inserted into socket 58 and seated in bearing 60 such that trunnion pin 61 extends into socket 58. Thus, propeller blade 20 is free to rotate about axis X, while trunnion pin 61 is free to rotate around axis X. Propeller hub 44 is connected with forward dome 50 at threaded fastener 62, which also typically comprises a bolt and nut. Shaft 42, hub 44, aft dome 49 and forward dome 50 comprise annular bodies that are disposed concentrically around axis Y. Hub 44 is driven to rotate about axis Y by core engine 14, thus causing hub 44, aft dome 49 and forward dome 50 to also rotate about axis Y. Accordingly, propeller blade 20 is rotated about axis Y to react with the bypass air $A_B$. Yoke 48 is disposed within hub 44 between forward dome 50 and aft dome 49. Flange 64 of yoke 48 is connected to bearing assembly 54, which is connected to bearing support plate 52 at threaded fastener 66, which typically comprises a bolt and nut or threaded hole. Bearing assembly 54 includes a bearing which receives trunnion pin 61 of propeller blade 20.

Yoke 48 and hydraulic coupling 51 divide actuator 46 into first pressure chamber 68 and second pressure chamber 70, which are filled with hydraulic fluid such that they have pressures P1 and P2, respectively. Although simplified greatly for the purposes of this application, pressures P1 and P2 are controlled by controlling the flow of hydraulic fluids into and out of chambers 68 and 70 through passage 72 or passage 72A. Seals 74A and 74B prevent hydraulic fluid from entering hub 44, while seal 74C seals between first pressure chamber 68 and second pressure chamber 70. Thus, as pressures P1 and P2 are adjusted by valve 72, yoke 48 translates along axis Y. Accordingly, feathering, unfeathering, speed governing, synchrophasing and beta control of propeller blades 20 is controlled. As yoke 48 translates along axis Y, flange 64 actuates the rotation of trunnion pin 61 around axis X, thereby changing the pitch of propeller blade 20 as propeller blade 20 rotates about axis X in bearing 60. The rotation of trunnion pin 61 about axis X causes a rotation of yoke 48 about axis Y.

Bearing assembly 54 is the final linkage between propeller blade 20 and actuation mechanism 12. Thus, bearing support plate 52 can be mounted within actuator 46 to provide a template for mounting bearing assembly 54 in either left-hand or right-hand configured engines. Bearing assembly 54 is also the transition point between trunnion pin 61, which tends to rotate about axis X as propeller blade 20 interacts with the bypass air $A_B$, and flange 64 which tends to translate along axis Y as yoke 48 is actuated by valve 72. Thus, bearing assembly 54 is configured with means to reduce wear from and to transfer the forces applied by trunnion pin 61.

Together, bearing assembly 54 and bearing support plate 52 provide an easily assembled system for assembly and actuation of propeller blade 20. For example, a plurality of bearing assemblies 54 are mounted in a unified pattern to bearing support plate 52 for receiving propeller blades 20. As such, during disassembly, after propeller blades 20 are removed from sockets 58 and dome 50 is removed from hub 44, yoke 48 can be removed from hub 44 bringing along with it bearing assemblies 54. Alternatively, yoke 48 can be removed from hub 44 leaving bearing assemblies 54 connected with trunnion pins 61 and unified in assembly to bearing support plate 52. During assembly, yoke 48 can be pre-assembled with bearing assemblies 54 mounted on bearing support plate 52 in the proper position such that upon insertion into hub 44 propeller blades 20 are readily inserted into sockets 58 with bearing assemblies 54 aligned for receiving trunnion pins 61. Alternatively, bearing assemblies 54 can be pre-assembled with trunnion pins 61 and then, after insertion of propeller blades 20 into sockets 58, assembled with bearing support plate 52. Thus, blade pitch actuation mechanism 12 is readily assembled or disassembled into sub-assemblies to facilitate maintenance or repair. For example, a hydraulic failure in actuator 46 can be addressed without the need for removing propeller blades 20 and bearing assemblies 54.

Figure 3:
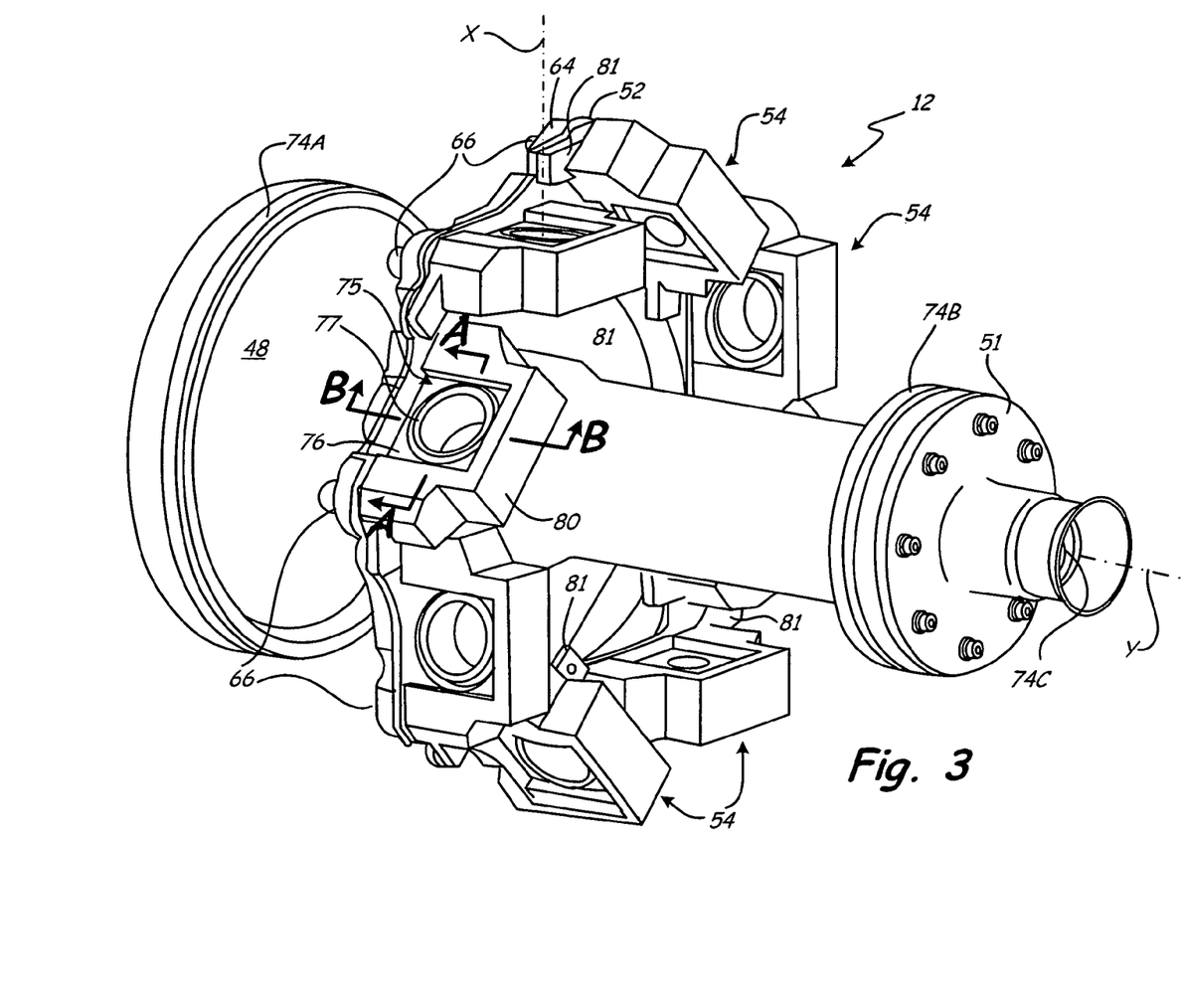
FIG. 3 shows a perspective back view of the blade pitch actuation mechanism of FIG. 2 having a plurality of bearing assemblies connected to a bearing support plate.

FIG. 3 shows a perspective back view of one sub-assembly arrangement of actuation mechanism 12 that facilitates simplified assembly of a turboprop propeller assembly. Yoke 48 and hydraulic coupling 51 of actuator 46 are assembled with bearing support plate 52 and a plurality of bearing assemblies 54. Each bearing assembly 54 includes bearing 75, comprising slider block 76, outer race 77 and ball 78, and bearing support 80, which includes flanges 81. FIG. 3 shows bearing support plate 52 mounted to flange 64 of yoke 48 in a right-hand configuration such that bearing assemblies 54 receive trunnion pins 61 of right-hand configured propeller blades 20. More particularly, bearing assemblies 54 receive trunnion pins 61 such that actuation of yoke 48 induces the proper rotation of propeller blades 20 within sockets 58 for a right-hand configured engine. However, bearing assemblies 54 are mountable to bearing support plate 52 in a left-hand configuration.

Figure 4A:
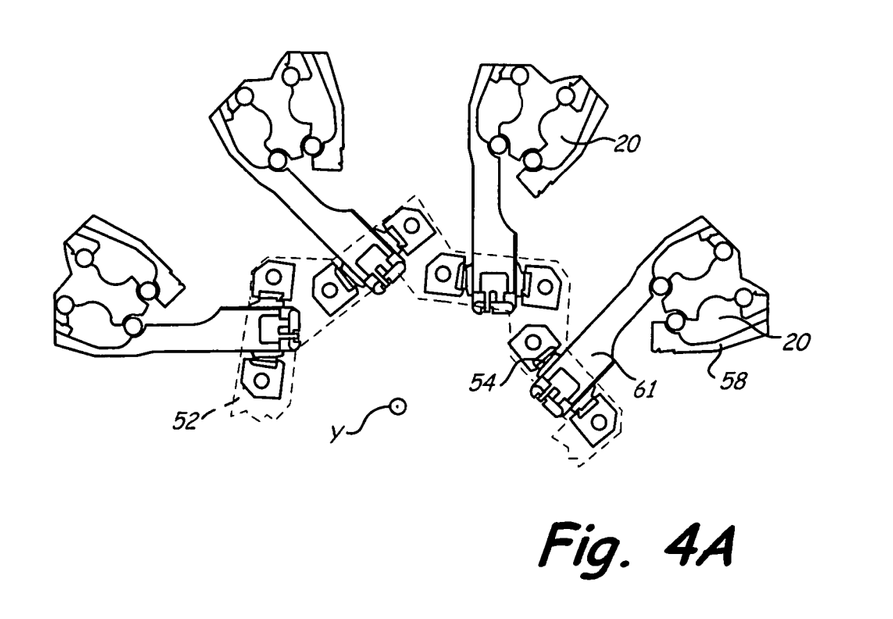
FIG. 4A shows a front view of a plurality of bearing assemblies mounted to the bearing support plate of FIG. 3 in a right-hand configuration.
Figure 4B:
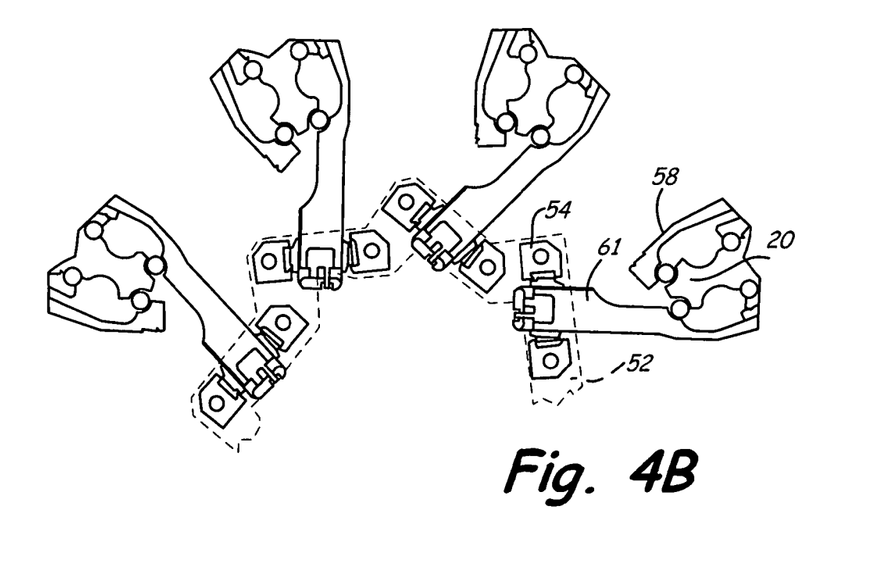
FIG. 4B shows a front view of a plurality of bearing assemblies mounted to the bearing support plate of FIG. 3 in a left-hand configuration.

FIG. 4A shows a front view of a simplified schematic of a plurality of propeller blades 20 mounted within sockets 58 of hub 44 and a plurality of trunnion pins 61 mounted within bearing assemblies 54 in a right-hand configuration. FIG. 4B shows a front view of a simplified schematic of a plurality of propeller blades 20 mounted within hubs 44 and a plurality of trunnion pins 61 mounted within bearing assemblies 54 in a left-hand configuration. Bearing assemblies 54 are mounted to support plate 52 (shown in phantom and oversized for clarity) such that they travel along axis Y when yoke 48 is actuated. Hubs 44 are, however, maintained stationary relative to axial movement along axis Y. Trunnion pins 61 are rotatable within bearing assemblies 54, and propeller blades 20 are rotatable within sockets 58. Thus, traversing of bearing assemblies along axis Y causes a rotation of propeller blades 20 within sockets 58.

Trunnion pins 61 are connected with propeller blades 20 on opposite sides of sockets 58 for left-hand and right-hand configurations. As viewed from the front, trunnion pins 61 are connected to blades 20 on the left side of sockets 58 in FIG. 4A, and trunnion pins 61 are connected to blades 20 on the right side of sockets 58 in FIG. 4B. Accordingly, as can be seen in FIG. 4A, a movement of bearing assemblies 54 in the forward direction along axis Y (out of the plane of FIG. 4A), causes rotation of propeller blades 20 in a first direction (clockwise if viewed from the blade tip to the hub along axis X) for right-hand configured propeller blades. Conversely, as can be seen in FIG. 4B, a movement of bearing assemblies 54 in the forward direction along axis Y (out of the plane of FIG. 4A), causes rotation of propeller blades 20 in a second direction (counter-clockwise if viewed from the blade tip to the hub along axis X) for left-hand configured propeller blades. In order to achieve this configuration with the desired pitch actuation, it is necessary for bearing assemblies 54 to be canted with respect to axis Y in different directions. Bearing support plate 52 accommodates both configurations thus requiring manufacture of only a single component and thereby reducing manufacturing and maintenance costs.

Figure 5A:
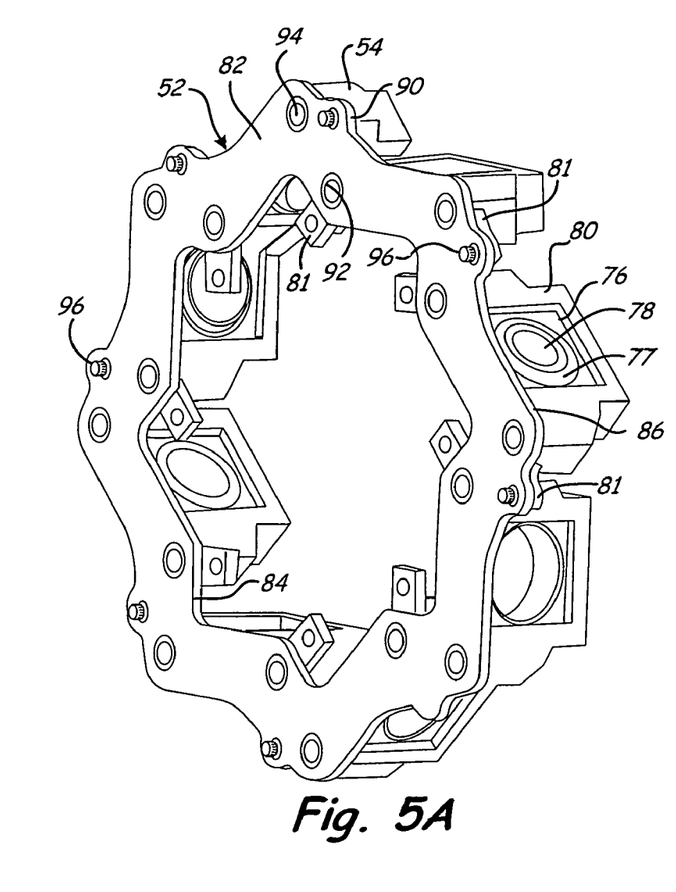
FIG. 5A shows a perspective view of the bearing assemblies of FIG. 3 mounted to the bearing support plate in a right-hand configuration.
Figure 5B:
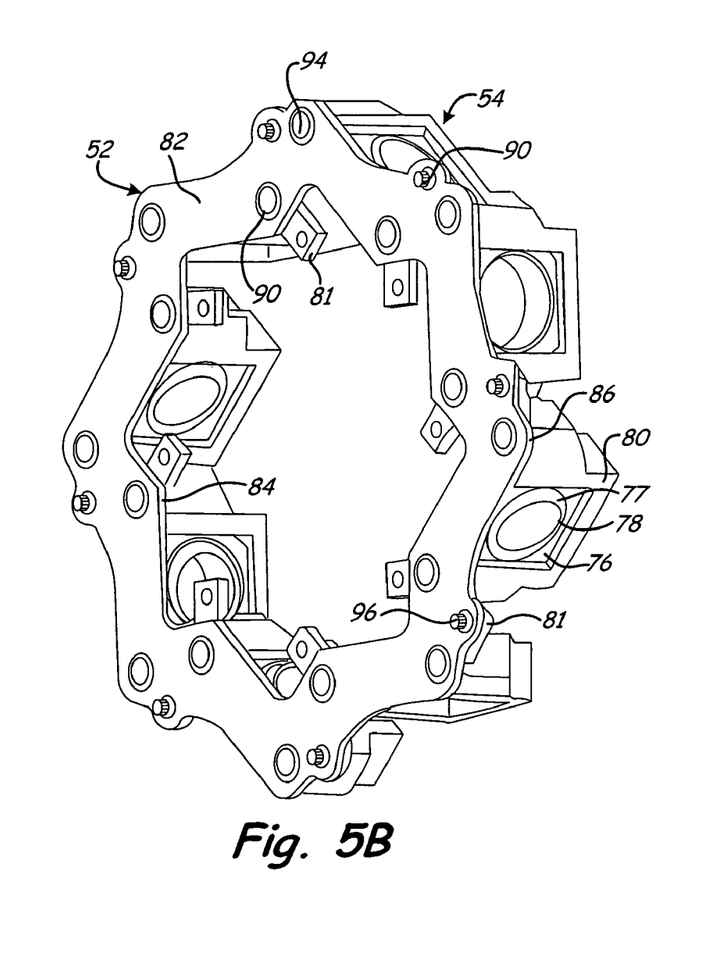
FIG. 5B shows a perspective view of the bearing assemblies of FIG. 3 mounted to the bearing support plate in a left-hand configuration.

FIG. 5A shows a perspective view of bearing assemblies 54 mounted to bearing support plate 52 of FIG. 3 in a right-hand configuration. FIG. 5B shows a perspective view of bearing assemblies 54 mounted to bearing support plate 52 of FIG. 3 in a left-hand configuration. Bearing support plate 52 includes ring shaped body 82, inner diameter 84, outer diameter 86, outer diameter flange 90, inner diameter holes 92 and outer diameter holes 94. Bearing assembly 54 includes slider block 76, outer race 77, ball 78 and bearing support 80, which includes flanges 81. FIG. 5B shows bearing support plate 52 of FIG. 5A rotated one hundred eighty degrees with respect to its fore and aft axis. Accordingly, inner diameter holes 92 and outer diameter holes 94, as well as inner diameter flange 88 and outer diameter flange 90, realign from a right-handed configuration to a left-handed configuration. Thus, bearing assemblies 54 can be mounted to bearing support plate in two configurations to receive trunnion pins 61 of propeller blades 20 arranged in left and right hand configurations.

Ring-like shaped body 82 is shaped to follow the general contour of bearing assemblies 54. Bearing support 80 of bearing assemblies 54 are aligned to be generally perpendicular to the axis of trunnion pins 61 (as seen in FIGS. 4A and 4B), which extend through and are allowed to rotate within ball 78. Inner diameter 84 and outer diameter 86 comprise multi-faceted surfaces that track the arrangement of bearing assemblies 54 in right-hand or left-hand arrangements. Body 82 thus only includes as little material as necessary to provide a buffer between bearing assemblies 54 and flange 64 of yoke 48, and to link each bearing assembly with one another. Accordingly, body 82 comprises a sacrificial layer between bearing assemblies 54 and yoke 48 that can be easily and inexpensively replaced, rather than replacing more costly components. Bearing support plate 82 provides temporary support of bearings support assemblies 54 prior to assembly of hydraulic actuator 46. Outer diameter holes 94 are arranged along the outer diameter 86 of body 82, and inner diameter holes 92 are arranged around inner diameter 84 of body 82. As such, inner and outer diameter holes 92 and 94 align with holes in bearing supports 80. Thus, threaded fasteners 66 (FIGS. 2 and 3) are used to clamp bearing assemblies 54 to flange 64 through bearing support plate 52. However, bearing assemblies 54 are also directly secured to bearing support plate 52 to facilitate assembly and disassembly of blade pitch actuation mechanism 12.

Bearing support plate 52 includes flanges 90 that align with flanges 81 of bearing support 80. Flanges 81 and flanges 90 include holes for receiving threaded fasteners 96, or some other such fastener. Thus, bearing assemblies 54 are securable to bearing support plate 52 such that yoke 48 can be inserted into hub 44 with bearing assemblies aligned for receiving trunnion pins 61. Conversely, yoke 48 can be removed from within hub 44, while leaving bearing assemblies 54 secured to bearing support plate 52 and suspended on trunnion pins 61. Yoke 48 includes a bolt hole pattern that permits coupling with bearing support plate 52 in either the left-hand and right-hand configuration.

Figure 6:
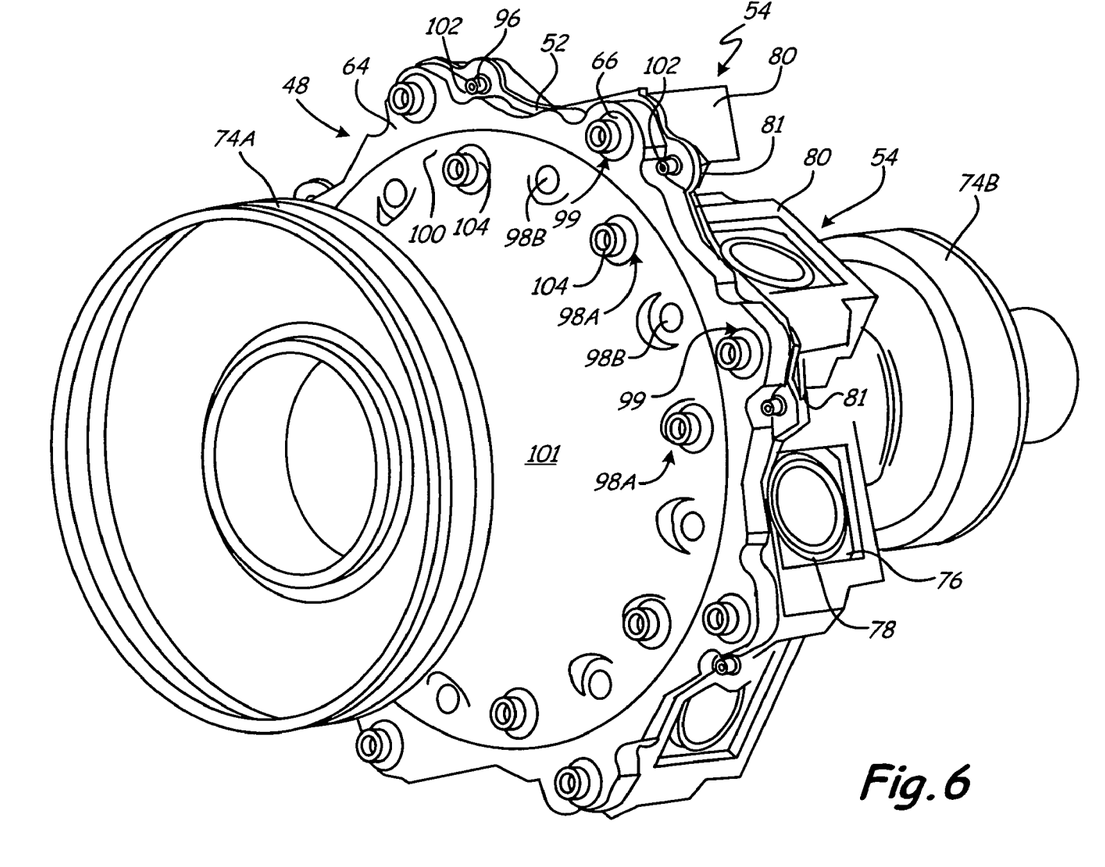
FIG. 6 shows a perspective front view of the blade pitch actuation mechanism of FIG. 3 having a bearing assembly yoke with left-hand and right-hand mounting bores.

FIG. 6 shows a perspective front view of blade pitch actuation mechanism 12 of FIG. 3 having bearing assembly yoke 48 with right-hand mounting holes 98A and left-hand mounting holes 98B. Yoke 48 includes outer diameter flange 64, inner diameter (or inboard) mounting holes 98A and 98B, outer diameter (or outboard) mounting holes 99. Yoke 48 is a conical forward yoke plate 101 that slopes from the forward end to the aft end of actuator 46 (as seen in FIG. 2) such that both forward and reverse loading transferred between trunnion pins 61 and actuator 46 are absorbed. Consequently, the need for an aft yoke plate to absorb forward and reverse loading is eliminated.

Yoke 48 is connected to bearing support assembly 54 through bearing support plate 52 by threaded fasteners 66 and 104. Threaded fasteners 66 also secure bearing supports 80 of bearing support assemblies 54 to yoke 48. Bearing supports 80 are also independently secured to bearing support 80 through bearing support plate 52 and threaded fasteners 96, which are accommodated by flange 64 at notches 102. Outer diameter mounting holes 99 align with outer diameter holes 94 of bearing support plate 52. Thus, threaded fasteners used in threaded fastener 66 can be inserted through flange 64 and bearing support plate 52 and inserted into threaded holes of bearing support 80 of bearing support assembly 54. Only one set of outer diameter holes is necessary for mating with bearing support 80. Outer diameter holes 94 of bearing support plate 52 are alternatively used when bearing support plate 52 is in either the right-hand or left-hand configuration (e.g. flipped one hundred eighty degrees as shown in FIGS. 5A and 5B).

Inner diameter holes 92 shift along inner diameter 84 of body 82 when bearing support plate 52 is flipped from a right-hand to left-hand configuration, though remaining the same radial distance from axis Y. Accordingly, yoke 48 includes both left-hand mounting holes 98A and right-hand mounting holes 98B. FIG. 6 shows bearing support plate 52 and bearing assemblies 54 connected with flange 64 in a right-hand configuration. Accordingly, only right-hand mounting holes 98A of the inner diameter mounting holes are used, as is shown with threaded fasteners 104. However, when bearing support plate 52 is mounted to flange 64 in a left-hand configuration, e.g. when bearing support plate 52 is flipped over, right-hand mounting holes 98A are not used and left-hand mounting holes 98B are used. As such, threaded fasteners 104 are shifted from holes 98A to holes 98B to align with holes in bearing supports 80. Additionally, when bearing assemblies 54 are locked down by threaded fasteners 66 and 104 with propeller blades 20 inserted into balls 78, yoke 48 assures that propeller blades 20 have a common blade angle through the connection of bearing assemblies 54 with trunnion pins 61. Bearing assemblies 54 also provide a heavy duty, wear resistant connection with trunnion pins 61.

Figure 7:
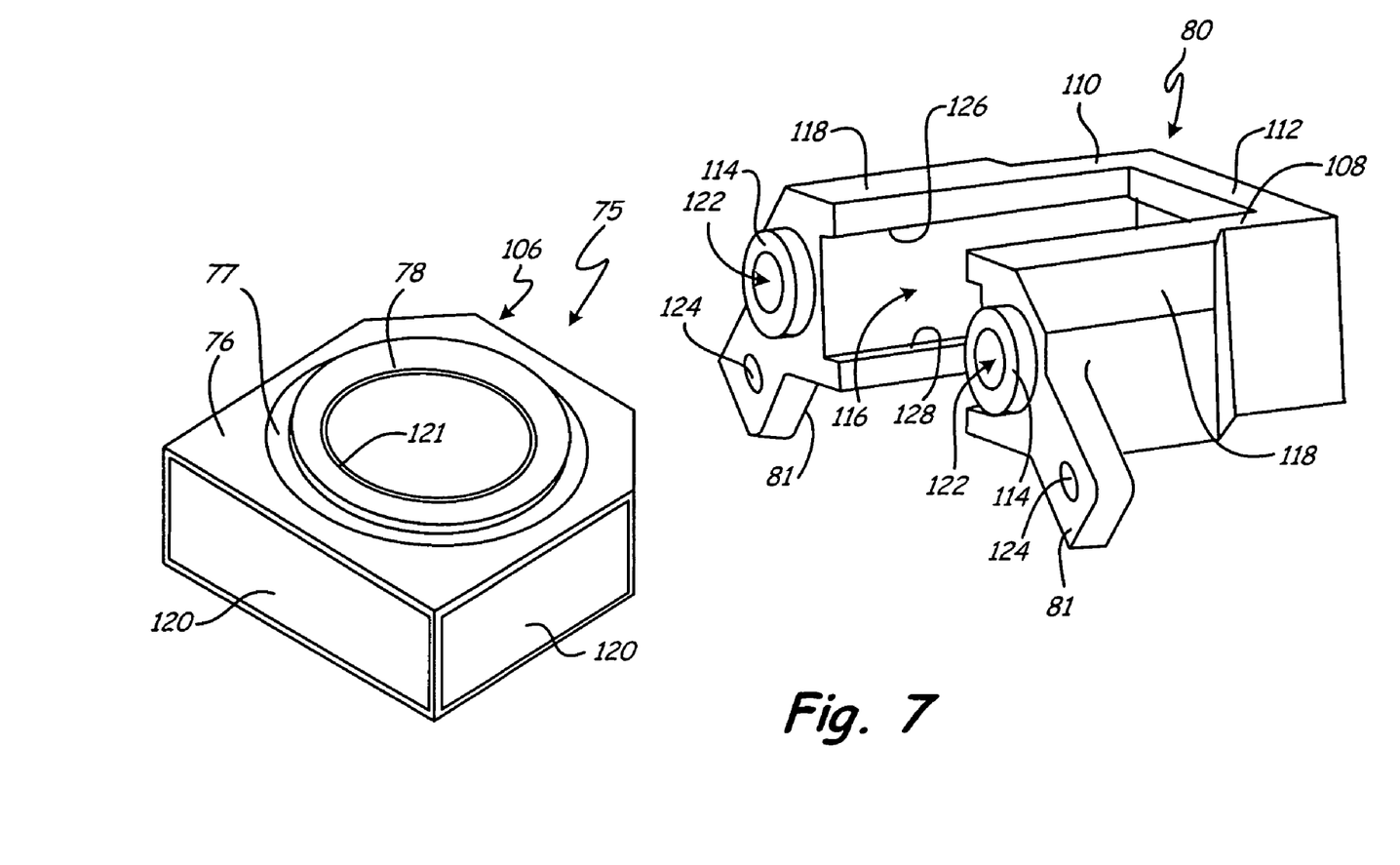
FIG. 7 shows an exploded view of a bearing assembly comprising a bearing and a bearing support.

FIG. 7 shows an exploded view of bearing assembly 54, which comprises bearing support 80 and bearing 75. Bearing support includes first side leg 108, second side leg 110, end leg 112, bearing support bushings 114, bearing support pocket 116. Bearing 75 includes slider block 76, outer race 77, ball bearing 78, outer diameter lining 120 and ball bearing liner 121. Slider block 76 comprises a rectilinear or square outer surface to reduce contact stresses between bearing support 80, bearing support plate 52, and bearing 75. Bearing support 80 comprises a "U" shaped or horseshoe shaped bracket that straddles slider block 76. Thus, bearing support bears reverse loading from trunnion pins 61 and actuator 46, again eliminating the need for an aft yoke plate. Rectilinear slider block 76 distributes the loading from trunnion pin 61 to a larger amount of surface area on bearing support 80, as opposed to, for example, a cylindrical type outer race.

Bearing 75 is inserted into pocket 116 such that bearing support 80 can be secured to bearing support plate 52 with bores 122 in bore portions 118. Bore portions 118 provide additional material flared from side legs 108 and 110 to accommodate threaded fasteners without adding excessive weight to bearing support 80. Bushings 114 are inserted into bores such that threaded fasteners 66 and 104 can be secured to support 80 after being inserted through yoke 54 and bearing support plate 52. Bushings 114 transfer rotational shear loads. Threaded fasteners are threaded into bearing support 80 to pre-load bearing support 80 against bearing support plate 52 and yoke 48. Thus, when forces from trunnion pins 61 attempt to separate bearing support 80 and support plate 52, the pre-load maintains the proper interface between bearing support 80 and support plate 52 to avoid tipping of bearing 75. Bushings 114 also reduce wear on front surface of bearing support 80. Additionally, the portion of bushings 114 that extend beyond bearing support 80 can be fitted into bores 92 and 94 of bearing support plate 52 to locate bearing support 80 with respect to bearing support plate 52, thus maintaining tight tolerances and accommodating machining and assembly tolerances. Alternatively, bearing support 80 is secured to bearing support plate 52 and yoke 48 with threaded fasteners 96 inserted into one of the bores 124 of flanges 81, depending on left or right hand assembly. Bores 124 are also provided with threaded holes to facilitate assembly with bearing support 80.

When in pocket 116, bearing 75 is effectively trapped between bearing support plate 52, side legs 108 and 110 and end leg 112. Top ridge 126 and bottom ridge 128 of pocket 116 restrict motion of bearing 75 along the axis of trunnion pins 61, along axis X of FIG. 2. Bearing support plate 52 and end leg 112 restrict axial movement of bearing 75 along axis Y of FIG. 2. Side leg 108 and side leg 110 restrict side to side movement of bearing 108, movement tangent to axis Y in FIG. 2. Thus, bearing support 80 is effectively able to resist loads imparted by bearing 75 from trunnion pin 61. Bearing 75 is thus restrained from moving in five degrees of movement. However, bearing support 80 can be removed from around bearing 75 without the need for removing trunnion pin 61 from bearing 75 since, among other things, no aft yoke plate is present.

Side legs 108 and 110, end leg 112 and slider block 76 are comprised of a hardened steel material. In order to reduce friction and wear between bearing support 80 and slider block 76 of bearing 75, lining 120 is provided along the edges of slider block 76. Lining 120 comprises any high-wear material suitable for reducing the friction between bearing support 80 and slider block 76. Lining 120 can be secured to slider block 76, or alternatively, to pocket 116, in any suitable manner, such as with an adhesive, an epoxy or some other such bonding material. In other embodiments, linings 118 and 120 are comprised of self-lubricating materials. Accordingly, the wear-life of bearing support 80 and slider block 76 are increased, and lining 120 can be easily and inexpensively replaced. Lining 120 also absorbs small dithering motions applied to bearing assembly 54 during operation of actuation mechanism 12 or from loading on propeller blades 20.

Figure 8A:
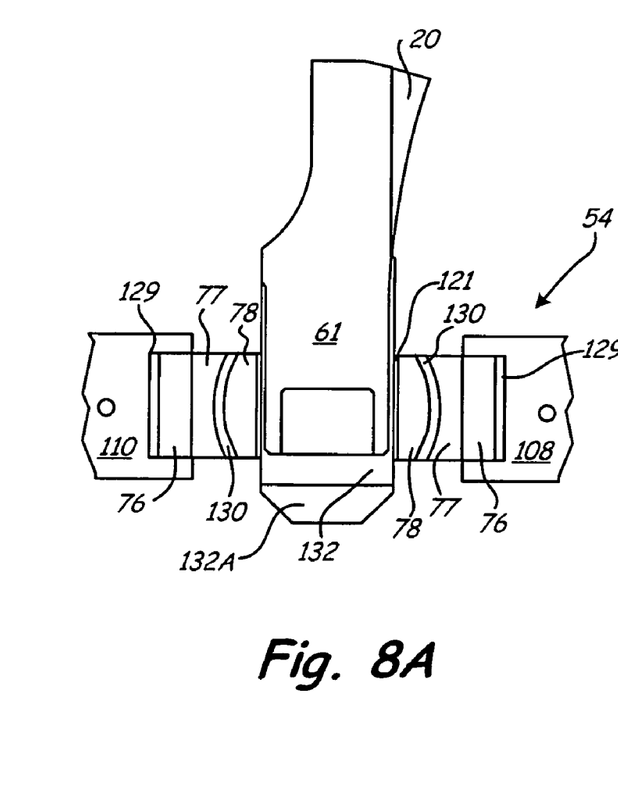
FIG. 8A shows a cross section extending through a bearing assembly of FIG. 3 in the tangential direction.
Figure 8B:
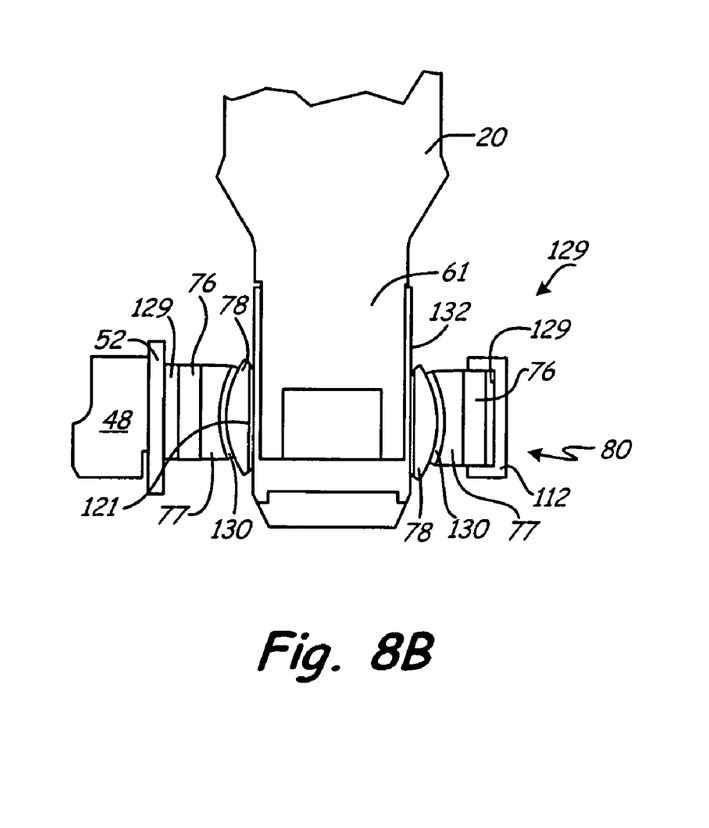
FIG. 8B shows a cross section extending through a bearing assembly of FIG. 3 in the axial direction.

FIG. 8A shows section A-A of FIG. 3 extending through bearing assembly 54 in the tangential direction. FIG. 8B shows section B-B of FIG. 3 extending through bearing assembly 54 in the axial direction. Slider block 76 is inserted into bearing support 80 such that bearing 75 can be connected to bearing support plate 52 and yoke 48. Slider block 76 includes a square-like or rectilinear outer diameter that inserts into a similarly shaped inner diameter within bearing support 80. Clearances 129 are provided between slider block 76 and bearing support 80 to accommodate machining and assembly tolerances. Clearances 129 are sized such that bearing assemblies can be easily assembled, but maintain tight linkage with trunnion pins 61. Slider block 76 includes a cylindrical or circular inner diameter for mating with outer race 77.

Outer race 77 comprises a cylindrical or circular outer diameter that rides within the inner diameter of slider block 76. The inner diameter of outer race 77 comprises a spherical race that receives the spherical outer diameter of ball 78. Ball 78 includes a cylindrical or circular inner diameter bore with lining 121, similar to that of lining 120, to reduce friction and wear of pin 61 and for receiving trunnion pin 61. Outer race 77 includes lining 130, similar to that of lining 120, to reduce friction against and wear of ball 78 and to absorb dithering movements. Trunnion pin 61 includes bumper 132, which provides a sleeve of buffer material between trunnion pin 61 and the circular inner diameter of ball 78. Sleeve 132 comprises a material such as a hardened steel for wear resistance. Bumper 132A is a trunnion pin tip that is non-metallic, such as a hardened rubber, to provide a buffer to avoid damaging surfaces of bearing 75 during assembly, thus reducing the potential for creating burs or other friction increasing blemishes.

Therefore, the blade pitch actuation mechanism of the present invention provides a bearing mounting plate for mounting bearing assemblies to an actuator in either a left-hand or a right-hand configuration. Additionally, the bearing assemblies include wear linings and bumpers to increase the service life of the actuation mechanism. The bearing assemblies and the bearing support plate permit easy maintenance and assembly of the blade pitch actuation mechanism of the present invention.

Although the present invention has been described with reference to preferred embodiments, workers skilled in the art will recognize that changes may be made in form and detail without departing from the spirit and scope of the invention.

The invention claimed is:

1. A blade pitch actuation mechanism for a plurality of propeller blades supported in a blade hub, the actuation mechanism comprising:
   a plurality of bearing assemblies for receiving a plurality of actuation trunnion pins from the plurality of propeller blades;
   a bearing support plate connected to the plurality of bearing assemblies and unifying the plurality of bearing assemblies in a ring-like configuration; and
   a yoke connected to the bearing support plate and for translating within the blade hub to adjust the pitch of the plurality of propeller blades.

2. The blade pitch actuation mechanism of claim 1 wherein the yoke translates within a hydraulic actuator disposed within the blade hub.

3. The blade pitch actuation mechanism of claim 1 wherein each of the bearing assemblies comprising the plurality of bearing assemblies comprises:

a bearing comprising:
  a slider block comprising:
    a rectilinear outer diameter; and
    a circular inner diameter; and
  a ball comprising:
    an outer diameter for rotation in the circular inner diameter of the slider block; and
    an inner diameter for receiving a actuation pin trunnion; and
  a bearing support for trapping the bearing between the bearing support and the bearing support plate.

4. The blade pitch actuation mechanism of claim 3 wherein the bearing support comprises a U-shaped structure.

5. The blade pitch actuation mechanism of claim 3 wherein each bearing assembly further comprises wear material positioned between outer diameter surfaces of the slider block and inner diameter surfaces of the bearing support.

6. The blade pitch actuation mechanism of claim 3 and further comprising a replaceable sleeve positioned within the inner diameter of the ball and for receiving an actuation pin trunnion from the plurality of propeller blades.

7. The blade pitch actuation mechanism of claim 3 wherein each bearing support includes clearance space between the outer diameter of the slider block, the bearing support plate, and the bearing support.

8. The blade pitch actuation mechanism of claim 3 wherein the three-sided bearing support includes:
  first and second sides secured to the bearing support plate; and
  a third side positioned between the first and second sides.

9. The blade pitch actuation mechanism of claim 1 wherein the bearing support plate includes a bolt hole for each bearing assembly that are arranged such that the plurality of bearing assemblies can be mounted to the bearing support plate in a left-hand or a right-hand configuration.

10. The blade pitch actuation mechanism of claim 9 wherein the yoke includes:
  a plurality of outer diameter bolt holes for aligning with bolt holes of the plurality of bearing assemblies in both the left-hand and right-hand configuration;
  a first plurality of inner diameter bolt holes for aligning with bolt holes of the plurality of bearing assemblies in the left-hand configuration; and
  a second plurality of inner diameter bolt holes for aligning with bolt holes of the plurality of bearing assemblies in the right-hand configuration.

11. The blade pitch actuation mechanism of claim 9 wherein the bearing support plate comprises a ring-like shape having multi-faceted inner and outer diameters that track the arrangement of the plurality of bearing assemblies in either the left-hand or right-hand configuration.

12. The blade pitch actuation mechanism of claim 11 wherein:
  the bearing support plate further includes a plurality of first bolt-hole flanges; and
  each of the bearing assemblies further includes a second bolt-hole flange for aligning with one of the plurality of first bolt-hole flanges such that each bearing assembly is securable to the bearing support plate outside the ring-like shape of the bearing support plate.

13. The blade pitch actuation mechanism of claim 12 wherein the plurality of first bolt-hole flanges extend from the outer diameters of the bearing support plate.

14. The blade pitch actuation mechanism of claim 1 wherein the yoke comprises a forward yoke plate having a profile sloped from the forward edge to the aft edge.

15. A blade pitch actuation mechanism comprising:
  a bearing comprising:
    a rectilinear slider block; and
    an inner diameter ball riding in the slider block and for receiving a trunnion pin from a propeller blade;
  a three-sided bearing retainer for surrounding the rectilinear outer race; and
  a bearing support plate connected to the three-sided bearing retainer for trapping the rectilinear slider block within the three-sided retainer.

16. The blade pitch actuation mechanism of claim 15 wherein the bearing support plate is configured for mounting to a yoke of a propeller blade actuator such that the bearing support plate provides a buffer between the yoke, the three-sided bearing retainer and the rectilinear slider block.

17. The blade pitch actuation mechanism of claim 16 wherein the three-sided bearing support includes bore portions for receiving means for mounting the three-sided bearing retainer to the yoke.

18. The blade pitch actuation mechanism of claim 17 wherein the bore portions include bore bushings for receiving the mounting means and for aligning the bearing support plate.

19. The blade pitch actuation mechanism of claim 15 and further comprising wear material positioned between the rectilinear slider block and the three-sided bearing retainer and the bearing support plate.

20. The blade pitch actuation mechanism of claim 15 and further comprising a bumper positioned at the end of the trunnion pin to protect the liner within the ball inner diameter.

21. The blade pitch actuation mechanism of claim 15 and further comprising an outer race between the slider block and the ball, and wear material positioned between the inner race and the inner diameter ball.

22. The blade pitch actuation mechanism of claim 15 wherein the three-sided bearing retainer includes a pocket such that movement of the rectilinear slider block is restrained in five degrees of movement.

23. The blade pitch actuation mechanism of claim 15 wherein a perimeter provided by the three-sided bearing support and the bearing support plate is larger than an outer diameter of the rectilinear slider block.

24. The blade pitch actuation mechanism of claim 15 wherein the bearing support plate further comprises:
  a body having a ring-like geometry;
  multi-faceted inner and outer diameters that track an arrangement of the plurality of bearing assemblies in either the left-hand or right-hand configuration; and
  a set of bolt holes for each bearing assembly between the multi-faceted inner and outer diameters that are arranged such that the plurality of bearing assemblies can be mounted to the bearing support plate in a left-hand or a right-hand configuration.

25. The blade pitch actuation mechanism of claim 24 wherein:
  the bearing support plate further includes a first bolt-hole flange extending beyond the perimeter of the body; and
  the three-sided bearing retainer further includes a second bolt-hole flange aligned with the first bolt-hole flange.

26. A blade pitch actuation mechanism comprising:
  a plurality of bearing assemblies for receiving a plurality of actuation pin trunnions from a plurality of propeller blades; and
  a bearing support plate configured for jointly connecting the plurality of bearing assemblies in either a left-hand or a right-hand orientation, the bearing support plate comprising:

a body having a ring-like geometry;

multi-faceted inner and outer diameters that track the arrangement of the plurality of bearing assemblies in either the left-hand or right-hand orientation; and a set of bolt holes for each bearing assembly that are positioned between the multi-faceted inner and outer diameters that are arranged such that the plurality of bearing assemblies can be mounted to the bearing support plate in either the left-hand or a right-hand orientation.

27. The blade pitch actuation mechanism of claim 26 and further comprising a yoke for translating within the blade pitch actuation mechanism to adjust the axial position of the plurality of bearing assemblies, the yoke comprising a set of bolt holes for receiving the plurality of bearing assemblies in either the left-hand or right-hand orientation.

28. The blade pitch actuation mechanism of claim 27 wherein the yoke includes a forward yoke plate having a profile slanted from the leading edge to the trailing edge for bearing forward and reverse loads of the bearing during translation within the hub.

29. The blade pitch actuation mechanism of claim 27 wherein the bearing support plate provides a buffer between the yoke, retainer and the plurality of bearing assemblies.

30. The blade pitch actuation mechanism of claim 27 wherein the set of bolt holes comprises:

a set of outer diameter bolt holes for aligning with bolt holes of the plurality of bearing assemblies in both the left-hand and right-hand orientation;

a first set of inner diameter bolt holes for aligning with bolt holes of the plurality of bearing assemblies in the left-hand orientation; and a second set of inner diameter bolt holes for aligning with bolt hoes of the plurality of bearing assemblies in the right-hand orientation.

31. The blade pitch actuation mechanism of claim 26 wherein:

the bearing support plate further includes a plurality of first bolt-hole flanges extending outside the ring-like geometry of the body; and each of the bearing assemblies further includes a second bolt-hole flange for aligning with one of the plurality of first bolt-hole flanges such that each bearing assembly is securable to the bearing support plate.

32. The blade pitch actuation mechanism of claim 31 wherein the plurality of first bolt-hole flanges extend from the outer diameters of the bearing support plate.

33. The blade pitch actuation mechanism of claim 26 and further comprising bushings positioned within the plurality of bearing assemblies aligned with bores in the bearing support plate.

* * * * *

UNITED STATES PATENT AND TRADEMARK OFFICE
CERTIFICATE OF CORRECTION

| | | |
|---|---|---|
| PATENT NO. | : 7,976,279 B2 | Page 1 of 1 |
| APPLICATION NO. | : 11/811491 | |
| DATED | : July 12, 2011 | |
| INVENTOR(S) | : Mark Raes et al. | |

It is certified that error appears in the above-identified patent and that said Letters Patent is hereby corrected as shown below:

Col. 11, Line 24
   Delete "retainer"

Signed and Sealed this
Eighteenth Day of October, 2011

David J. Kappos
*Director of the United States Patent and Trademark Office*